(12) United States Patent
Morooka

(10) Patent No.: US 8,982,484 B2
(45) Date of Patent: Mar. 17, 2015

(54) IMAGING OPTICAL SYSTEM, AND IMAGING APPARATUS INCORPORATING THE SAME

(71) Applicant: Olympus Imaging Corp., Tokyo (JP)

(72) Inventor: Masaru Morooka, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/948,896

(22) Filed: Jul. 23, 2013

(65) Prior Publication Data

US 2014/0063624 A1    Mar. 6, 2014

(30) Foreign Application Priority Data

Aug. 30, 2012    (JP) ................................. 2012-189519

(51) Int. Cl.
*G02B 9/06* (2006.01)
*G02B 13/00* (2006.01)
*G02B 13/02* (2006.01)

(52) U.S. Cl.
CPC ................ *G02B 13/002* (2013.01); *G02B 9/06* (2013.01); *G02B 13/02* (2013.01)
USPC .......................................... 359/794; 359/793

(58) Field of Classification Search
CPC .. G02B 13/002; G02B 13/02; G02B 13/0045; G02B 13/006
USPC .......................................... 359/740, 793, 794
See application file for complete search history.

(56) References Cited

U.S. PATENT DOCUMENTS

| | | | | |
|---|---|---|---|---|
| 7,440,196 B2 * | 10/2008 | Kobayashi | .................... | 359/691 |
| 7,869,144 B2 * | 1/2011 | Heu | ............................... | 359/794 |
| 7,924,511 B2 * | 4/2011 | Shibata | ......................... | 359/792 |
| 8,526,128 B2 * | 9/2013 | Kubota et al. | ................. | 359/762 |
| 8,547,651 B2 * | 10/2013 | Kubota et al. | ................. | 359/794 |
| 8,654,448 B2 * | 2/2014 | Morooka et al. | .............. | 359/684 |
| 2009/0273851 A1 | 11/2009 | Take et al. | | |
| 2014/0071331 A1 * | 3/2014 | Katou et al. | .................. | 348/345 |
| 2014/0092271 A1 * | 4/2014 | Katou et al. | ............... | 348/222.1 |

FOREIGN PATENT DOCUMENTS

JP        2009-251398        10/2009

* cited by examiner

*Primary Examiner* — David N Spector
(74) *Attorney, Agent, or Firm* — Kenyon & Kenyon LLP

(57) ABSTRACT

An imaging optical system including, from the object side to the image side, a first lens group having positive refracting power, an aperture stop, and a second lens group having positive power, in which the first lens group consists of three lens subgroups, having positive, negative and positive refracting powers, respectively, from the object side to the image side, with satisfaction of the following:

$$4<(LTL+fB)/fB<15 \qquad (1)$$

$$0.3<D12/IH<4 \qquad (2)$$

where fB is an on-axis distance, from an image side-surface in the second lens group to an image plane upon focusing at infinity, LTL is an on-axis distance from an object side-surface in the first lens group to the image side-surface in the second lens group, D12 is an on-axis length from an image side-surface in the first lens group to an object side-surface in the second lens group upon focusing at infinity, and IH is a maximum image height.

20 Claims, 8 Drawing Sheets

Example1

IMAGING OPTICAL SYSTEM, AND IMAGING APPARATUS INCORPORATING THE SAME

This application claims benefit of Japanese Application No. 2012-189519 filed in Japan on Aug. 30, 2012, the contents of which are incorporated by this reference.

BACKGROUND OF THE INVENTION

The present invention relates to an imaging optical system used with taking optical systems, etc., and further to an imaging apparatus such as digital still cameras using an imaging optical system.

So far, an imaging optical system like the one set forth in Patent Publication 1 has been known as a large-aperture imaging optical system.

Patent Publication 1: JP(A) 2009-251398

SUMMARY OF THE INVENTION

According to one embodiment of the invention, there is an imaging optical system provided, characterized by comprising, in order from an object side to an image side, a first lens group having positive refracting power, an aperture stop, and a second lens group having positive refracting power, wherein:

there is no lens group other than said first lens group and said second lens group, said first lens group consists of three lens subgroups: in order from the object side to the image side, a first lens subgroup having positive refracting power, a second lens subgroup having negative refracting power, and a third lens subgroup having positive refracting power, with satisfaction of the following Conditions (1) and (2):

$$4 < (LTL + fB)/fB < 15 \quad (1)$$

$$0.3 < D12/IH < 4 \quad (2)$$

where fB is an on-axis distance, as calculated on an air basis, from an image side-surface in said second lens group to an image plane upon focusing on an object at infinity, LTL is an on-axis distance from an object side-surface in said first lens group to the image side-surface in said second lens group, D12 is an on-axis length from an image side-surface in said first lens group to an object side-surface in said second lens group upon focusing on an object at infinity, and IH is the maximum image height.

According to one embodiment of the invention, there is an imaging optical system provided, comprising: in order from an object side to an image side, a first lens group having positive refracting power, an aperture stop, and a second lens group having positive refracting power, wherein:

there is no lens group other than said first lens group and said second lens group, said first lens group consists of three lens subgroups: in order from the object side to the image side, a first lens subgroup having positive refracting power, a second lens subgroup having negative refracting power, and a third lens subgroup having positive refracting power, and upon focusing from an object at infinity to a near distance object, the first lens group remains stationary, and the second lens group moves toward the object side, with satisfaction of the following Condition (3):

$$1.2 < f1/f2 < 2.5 \quad (3)$$

where f1 is the focal length of the first lens group, and f2 is the focal length of the second lens group.

According to one embodiment of the invention, there is an imaging apparatus provided, comprising:

said imaging optical system, and an imaging device located on an image side of said imaging optical system.

Still other objects and advantages of the invention will in part be obvious and will in part be apparent form the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

Figure 1:
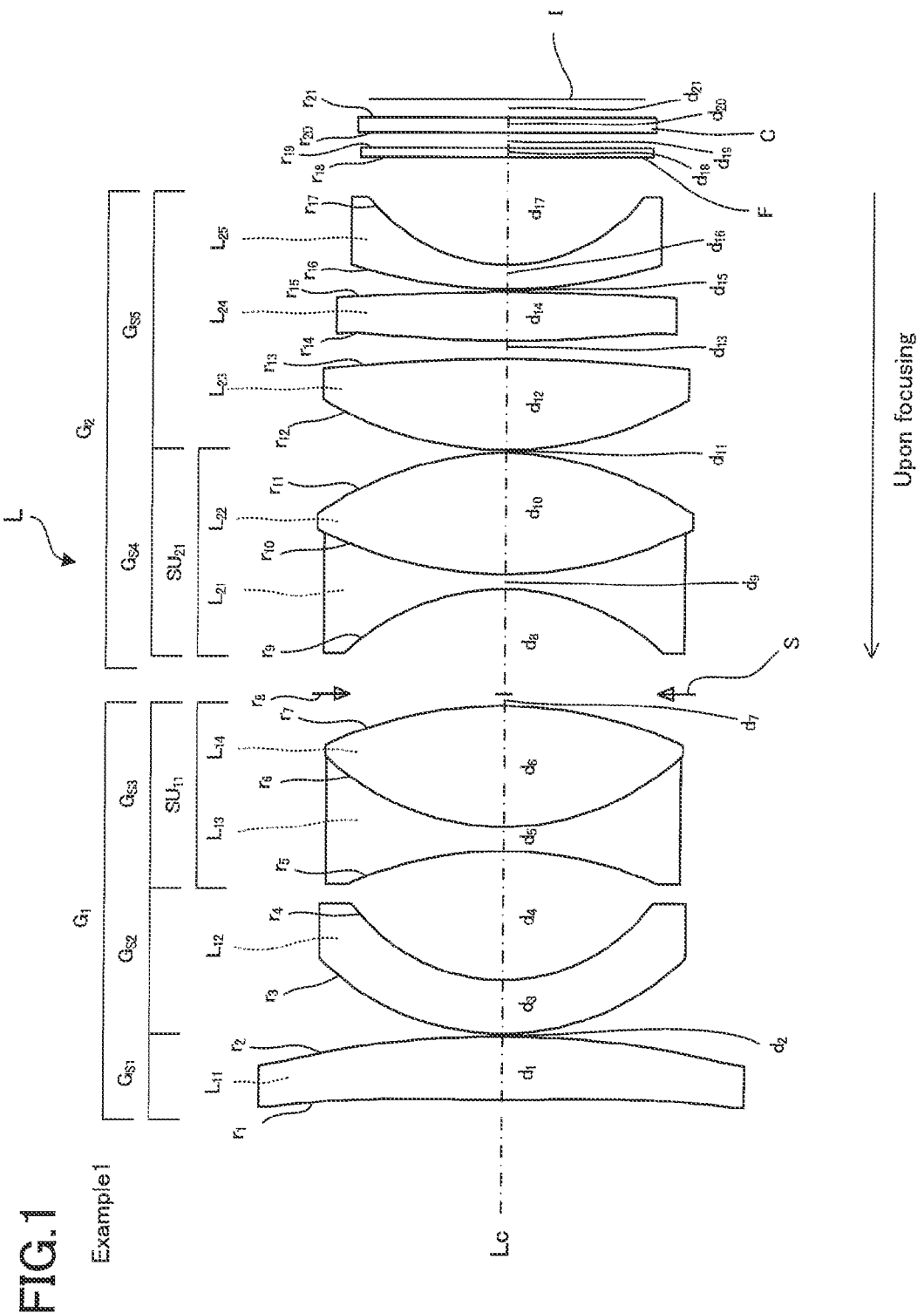
FIG. 1 is a sectional view of the imaging optical system according to Example 1 of the invention.

The imaging optical system set forth in Patent Publication 1 has a total angle of view of about 30°, and as the refracting power of a lens group on the image side with respect to the aperture stop gets stronger to make the angle of view wide while keeping the back focus intact, there are spherical aberrations and coma likely to occur. The imaging optical system of Patent Publication 1 is also operable to move a plurality of lens groups for focusing, but the mechanism involved may likely get complicated.

In one embodiment, the invention provides an imaging optical system that facilitates aberration reductions while makes sure brightness and a proper angle of view. In one embodiment, the invention provides an imaging optical system that allows for a simple structure of the focusing mechanism. In one embodiment, the invention provides an imaging apparatus incorporating such an imaging optical system.

According to one aspect of the invention, there is an imaging optical system provided, which is basically built up of, in order from an object side to an image side, a first lens group having positive refracting power, an aperture stop, and a second lens group having positive refracting power, wherein:

there is no lens group other than said first lens group and said second lens group, and said first lens group consists of three lens subgroups: in order from the object side to the image side, a first lens subgroup having positive refracting power, a second lens subgroup having negative refracting power, and a third lens subgroup having positive refracting power.

The aforesaid basic construction of the inventive imaging optical system wherein the first and second lens groups, each having positive refracting power, are located with the aperture stop interposed between them works in favor of offering tradeoffs between increasing aperture and decreasing aberrations. The converging action of the first lens group helps keep the heights of rays through the second lens group low, so much so that even when brightness is ensured, the diameter of the second lens group could be kept small.

To ensure a back focus at a focal length enough to allow the total angle of view to be greater than 40°, it is preferable to concentrate positive refracting power on the image side of the whole imaging optical system. At this time, if the refracting power of the second lens group is brought up to concentrate positive refracting power on the image side, spherical aberrations and field curvature may likely be produced at the second lens group.

For this reason, the third lens subgroup having positive refracting power is located just in front of the aperture stop with the consequence that the negative refracting power that must be shared by the second lens group could be alleviated, thereby reducing the aberrations produced. More specifically, the lens setup on the object side with respect to the aperture stop is made up of, in order from the object side to the image side, the positive, first lens subgroup, the negative, second lens subgroup, and the positive, third lens subgroup that holds back the occurrence of various aberrations at the second lens group. This lens layout works in favor of reducing aberrations throughout the imaging optical system, making sure brightness, and so on.

Preferably, such a basic construction should satisfy the following Conditions (1) and (2):

$$4 < (LTL + fB)/fB < 15 \quad (1)$$

$$0.3 < D12/IH < 4 \quad (2)$$

where fB is an on-axis distance, as calculated on an air basis, from an image side-surface in said second lens group to an image plane upon focusing at infinity, LTL is an on-axis distance from an object side-surface in said first lens group to the image side-surface in said second lens group, D12 is an on-axis length from an image side-surface in said first lens group to an object side-surface in said second lens group upon focusing on an object at infinity, and IH is the maximum image height.

Keeping the imaging optical system against being short of the lower limit value of Condition (1) thereby bringing the image side-surface in the second lens group close to the image plane may work in favor of reductions of aberrations by making sure a lens setup space for the second lens group. At the same time, the effective diameter of the second lens group may be made small, working in favor of offering tradeoffs between ensuring brightness and reducing size.

Keeping the imaging optical system against exceeding the upper limit value of Condition (1) may help reduce a risk of a camera body interfering with the imaging optical system when it is used as an interchangeable lens.

Keeping the imaging optical system against being short of the lower limit value of Condition (2) may make sure a separation between the first and the second lens group, thereby making sure a space for receiving the aperture stop mechanism.

Keeping the imaging optical system against exceeding the upper limit value of Condition (2) may make the effective diameter of the first lens group small, working in favor of offering tradeoffs between ensuring brightness and reducing size.

Preferably, the imaging optical system operates such that, upon focusing from an infinite object to a near distance object, the first lens group remains stationary and the second lens group moves toward the object side.

As described above, the invention makes it possible to reduce the occurrence of various aberrations at the second lens group. To this end, if the second lens group is set up as a lens group capable of moving upon focusing, there is then an imaging optical system achieved that is less susceptible of aberration fluctuations during focusing. The number of lens groups that move upon focusing may also be curtailed, leading to energy savings. In addition, an inner focus system having a constant full length is achievable, working in favor of preventing ingress of dust during focusing, and reducing noise leakage during focusing as well.

Preferably, the imaging optical system should satisfy the following Condition (3):

$$1.2 < f1/f2 < 2.5 \quad (3)$$

where f1 is the focal length of the first lens group, and f2 is the focal length of the second lens group.

Defining the focal length ratio between the first lens group and the second lens group by virtue of Condition (3) may work more in favor of holding back various aberrations throughout the imaging optical system.

Keeping the imaging optical system against falling short of the lower limit value of Condition (3) may make sure the refracting power of the second lens group, working in favor of taking hold of the back focus.

Keeping the imaging optical system against exceeding the upper limit value of Condition (3) may lead to keeping the refracting power of the second lens group small, leading to making sure the lens groups before and after the aperture stop has a symmetrical refracting power profile, and working in favor of correction of coma, etc. throughout the imaging optical system when it has a large aperture.

According to the second aspect of the invention, there is an imaging optical system provided, comprising: in order from an object side to an image side, a first lens group having positive refracting power, an aperture stop, and a second lens group having positive refracting power, wherein:

there is no lens group other than said first lens group and said second lens group, said first lens group consists of three lens subgroups: in order from the object side to the image side, a first lens subgroup having positive refracting power, a second lens subgroup having negative refracting power, and a third lens subgroup having positive refracting power, and upon focusing from an infinite object to a near distance object, the first lens group remains stationary, and the second lens group moves toward the object side, with satisfaction of the following Condition (3)):

$$1.2 < f1/f2 < 2.5 \tag{3}$$

where f1 is the focal length of the first lens group, and f2 is the focal length of the second lens group.

As described above, the second aspect of the invention may work in favor of making sure the back focus, the angle of view, brightness and optical performance, and focusing as well.

Any one of the aforesaid imaging optical systems should preferably satisfy one of the following requirements, or two or more thereof at the same time.

It is preferable that the second lens group comprises, in order from the object side to the image side, a fourth lens subgroup and a fifth lens group having positive refracting power, wherein:

the fourth lens subgroup includes a negative lens that is a lens positioned on the most object side in the fourth lens subgroup, and the fifth lens subgroup includes a plurality of positive lenses.

The second lens group on the image side with respect to the aperture stop has a negative lens located on the most object side and the positive, fifth lens subgroup located on the image side, setting up an arrangement approximate to the Gauss type that works much more in favor of offering tradeoffs between large apertures and reduced aberrations. The second lens group has a generally positive refracting power, and if two or more positive lenses are located in the fifth lens subgroup, it may then favor reductions of spherical aberrations that occur as the aperture grows large, and coma as well.

The fourth and the fifth lens subgroups should each preferably include an aspheric lens surface.

The second lens group may reduce spherical aberrations, astigmatism and coma by itself. This may work much more in favor of offering tradeoffs between performance improvements throughout the imaging optical system in a full-focus state and large apertures.

Preferably, the fourth lens subgroup should consist of one cemented lens including a negative lens and a positive lens.

If the negative lens is cemented to the positive lens while the diverging action of the negative lens is maintained, it may then work in favor of reductions of chromatic aberrations, less deterioration of images due to lens decentration, and size reductions.

Preferably, the fifth lens subgroup should consist of three lens components: in order from the object side to the image side, a positive lens component, a positive lens component and a negative lens component.

The lens component here is understood to refer to a lens block where there are only two refractive surfaces in on-axis contact with air: an object side-surface and an image side-surface.

This works in favor of making sure the fifth lens subgroup has positive refracting power and reductions of aberrations.

Preferably, the third lens subgroup should include a negative lens and a positive lens located more on the image side than the negative lens.

This allows the third lens subgroup to be of the retro focus type made up of the negative and the positive lens in order from the object side, taking hold of the back focus.

Preferably, the first lens subgroup should include an aspheric lens surface.

This may work much more in favor of correction of spherical aberrations and astigmatism occurring when the first lens subgroup has a larger aperture.

Preferably, the first lens subgroup should consist of one positive lens component, the second lens subgroup should consist of one negative lens component, and the third lens subgroup should consist of one positive lens component.

The lens component here is understood to refer to a lens block where there are only two refractive surfaces in on-axis contact with air: an object side-surface and an image side-surface.

This may work in favor of cost and size reductions.

The third lens subgroup should consist of one cemented lens including a positive lens and a negative lens.

This may work in favor of reductions of chromatic aberrations, less deterioration of images due to lens decentration, and size reductions.

Preferably, the imaging optical system should preferably satisfy at least one of the following Conditions (4) and (5):

$$0.80 < \phi/f < 1.5 \tag{4}$$

$$40° < 2 \times \omega < 70° \tag{5}$$

where $\phi$ is the maximum diameter of the entrance pupil of the imaging optical system, f is the focal length of the imaging optical system, and $\omega$ is the maximum taking half angle of view of the imaging optical system.

Keeping the imaging optical system against running short of the lower limit value of Condition (4) may lead to taking hold of sufficient brightness, because the focal length of the imaging optical system may be kept short while the maximum diameter of the entrance pupil is maintained.

Keeping the imaging optical system against exceeding the upper limit value of Condition (4) may lead to size reductions of the imaging optical system, because the maximum diameter of the entrance pupil is kept moderate.

As the imaging optical system is kept against falling short of the lower limit value of Condition (5) to take hold of the angle of view and against exceeding the upper limit value of Condition (5) to keep the angle of view moderate, it may make sure an angle of view in favor of offering tradeoffs between cost reductions, reductions of aberrations, and taking hold of brightness, leading to a downsizing of the imaging optical system.

It is here to be noted that Conditions (4) and (5) may be separately specified.

If any one of the aforesaid imaging optical systems is combined with an imaging device located on the image side of the imaging optical system into an imaging apparatus, it is then possible to take images by the imaging optical system that works in favor of offering tradeoffs between taking hold of brightness and taking hold of optical performance.

Two or more of the aforesaid requirements should preferably be satisfied at the same time.

Preferably, each condition should be reduced down as follows, because its function may be more reliable.

Of Condition (1), it is more preferable that the lower limit value is set at 5, and especially 6, and the upper limit value is set at 11, and especially 7.

Of Condition (2), it is more preferable that the lower limit value is set at 0.5, and especially 0.7, and the upper limit value is set at 2.5, and especially 1.

Of Condition (3), it is more preferable that the lower limit value is set at 1.5, and especially 1.8, and the upper limit value is set at 2.4, and especially 2.3.

Of Condition (4), it is more preferable that the lower limit value is set at 0.85, and especially 0.90, and the upper limit value is set at 1.3, and especially 1.1.

Of Condition (5), it is more preferable that the lower limit value is set at 42°, and especially 44°, and the upper limit value is set at 60°, and especially 50°.

With the invention, it is possible to provide an imaging optical system that facilitates reductions of aberrations while brightness and a proper angle of view are maintained. It is also possible to provide an imaging optical system that makes it easy to simplify the focusing mechanism involved. Further, it is possible to provide an imaging apparatus incorporating such an imaging optical system.

The inventive imaging optical system will now be explained with reference to the accompanying drawings.

The inventive imaging optical system basically comprises, in order from the object side to the image side, the first lens group $G_1$ of positive refracting power, the aperture stop S, and the second lens group $G_2$ of positive refracting power, wherein there is no lens group other than the first $G_1$ and the second lens group $G_2$, and the first lens group $G_1$ consists of three lens subgroups: in order from the object side to the image side, the first lens subgroup $G_{S1}$ of positive refracting power, the second lens subgroup $G_{S2}$ of negative refracting power, and the third lens subgroup $G_{S3}$ of positive refracting power.

In both Examples 1 and 2 of the inventive imaging optical system, the second lens group alone moves to the object side for focusing from infinity to near distances.

In Examples 1 and 2, a plane plate C just in front of the imaging plane represents an optically equivalent plane-parallel plate that is a package comprising a cover glass of the imaging device, a low-pass filter, an infrared cut filter and a dust removal filter, and a plane plate on the object side of the cover glass C is an infrared cut filter F. The capital letter I is indicative of the image plane.

FIG. 1 is a sectional view of the imaging optical system of Example 1.

As depicted in FIG. 1, the imaging optical system of Example 1 is built up of, in order from the object side to the image side, the first lens group $G_1$ of positive refracting power, the aperture stop S, and the second lens group $G_2$ of positive refracting power.

The first lens group $G_1$ is made up of, in order from the object side to the image side, the first lens subgroup $G_{S1}$ of positive refracting power, the second lens subgroup $G_{S2}$ of negative refracting power, and the third lens subgroup $G_{S3}$ of positive refracting power.

The first lens subgroup $G_{S1}$ consists of one double-convex positive lens $L_{11}$.

The second lens subgroup $G_{S2}$ consists of one negative meniscus lens $L_{12}$ convex on its object side.

The third lens subgroup $G_{S3}$ consists of a cemented lens $SU_{11}$ of a double-concave negative lens $L_{13}$ and a double-convex positive lens $L_{14}$.

The second lens group $G_2$ is made up of, in order from the object side to the image side, the fourth lens subgroup $G_{S4}$ of positive refracting power and the fifth lens subgroup $G_{S5}$ of negative refracting power.

The fourth lens subgroup GS4 consists of a cemented lens $SU_{21}$ of a double-concave negative lens $L_{21}$ and a double-convex positive lens $L_{22}$.

The fifth lens subgroup $G_{S5}$ consists of a double-convex positive lens $L_{23}$, a double-convex positive lens $L_{24}$, and a negative meniscus lens $L_{25}$ convex on its object side.

Between the first $G_1$ and the second lens group $G_2$ there is the aperture stop S interposed.

A total of five aspheric surfaces are used: two at both surfaces $r_1$ and $r_2$ of the double-convex positive lens $L_{11}$ forming the first lens subgroup $G_{S1}$ in the first lens group $G_1$, one at the most image side-surface $r_{11}$ of the cemented lens $SU_{21}$ forming the fourth lens subgroup $G_{S4}$ in the second lens group $G_2$, and two at both surfaces $r_{14}$ and $r_{15}$ of the image side double-convex positive lens $L_{24}$ in the fifth lens subgroup $G_{S5}$ in the second lens group $G_2$.

Figure 2:
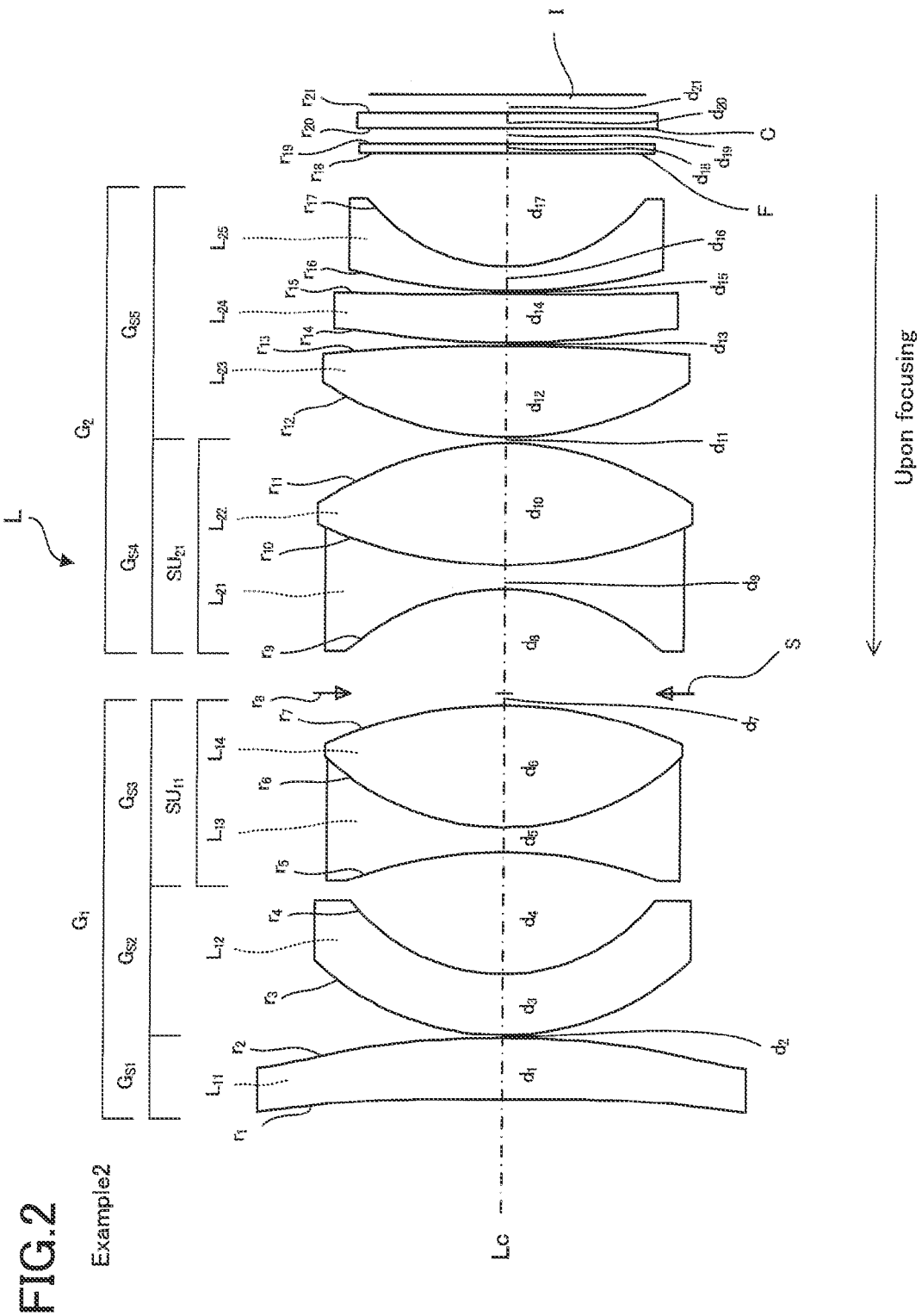
FIG. 2 is a sectional view of the imaging optical system according to Example 2 of the invention.

FIG. 2 is a sectional view of the imaging optical system of Example 2.

As depicted in FIG. 2, the imaging optical system of Example 2 is built up of, in order from the object side to the image side, the first lens group $G_1$ of positive refracting power, the aperture stop S, and the second lens group $G_2$ of positive refracting power.

The first lens group $G_1$ is made up of, in order from the object side to the image side, the first lens subgroup $G_{S1}$ of positive refracting power, the second lens subgroup $G_{S2}$ of negative refracting power, and the third lens subgroup $G_{S3}$ of positive refracting power.

The first lens subgroup $G_{S1}$ consists of one positive meniscus lens $L_{11}$ convex on its image side.

The second lens subgroup $G_{32}$ consists of one negative meniscus lens $L_{12}$ convex on its object side.

The third lens subgroup $G_{S3}$ consists of a cemented lens $SU_{11}$ of a double-concave negative lens $L_{13}$ and a double-convex positive lens $L_{14}$.

The second lens group $G_2$ is made up of, in order from the object side to the image side, the fourth lens subgroup $G_{S4}$ of positive refracting power and the fifth lens subgroup $G_{S5}$ of negative refracting power.

The fourth lens subgroup $G_{S4}$ consists of a cemented lens $SU_{21}$ of a double-concave negative lens $L_{21}$ and a double-convex positive lens $L_{22}$.

The fifth lens subgroup $G_{S5}$ consists of a double-convex positive lens $L_{23}$, a double-convex positive lens $L_{24}$, and a negative meniscus lens $L_{25}$ convex on its object side.

A total of five aspheric surfaces are used: two at both surfaces $r_1$ and $r_2$ of the double-convex positive lens $L_{11}$ forming the first lens subgroup $G_{S1}$ in the first lens group $G_1$, one at the most image side $r_{11}$ of the cemented lens $SU_{21}$ forming the fourth lens subgroup $G_{S4}$ in the second lens group $G_2$, and two at both surfaces $r_{14}$ and $r_{15}$ of the image side double-convex positive lens $L_{24}$ in the fifth lens subgroup $G_{S5}$ in the second lens group $G_2$.

Set out below are an assortment of numeral data in Examples 1 and 2 (surface data, a variety of data, focus data and the focal lengths of the respective lens groups).

The surface data here include the radius of curvature r and surface separation d of the lens surface for each surface number, the d (587.6 nm)-line refractive index nd of each lens (optical medium), and the d-line Abbe constant νd of each lens (optical medium). The radius of curvature r and surface separation d are given in mm. In the surface data, ∞ given in the radius-of-curvature column is indicative of infinity.

Aspheric surface data include data about aspheric lens surfaces. Suppose here that x is an optical axis with the proviso that the direction of travel of light is taken as positive, and y is a direction orthogonal to the optical axis. Then, aspheric surface shape is represented by the following formula.

$$x=(y^2/r)/[1+\{1-(1+K)\cdot(y/r)^2\}^{1/2}]+A4y^4+A6y^6+A8y^8+A10y^{10}$$

In the aforesaid formula, r is the paraxial radius of curvature, K is the conical coefficient, and F4, A6, A8 and A10 are the $4^{th}$-, $6^{th}$-, $8^{th}$-, and $10^{th}$-order aspheric coefficients. Note here that the small letter "e" is indicative of an exponent power with the following numeral having 10 as a base. For instance, "1.0e−5" means "$1.0\times10^{-5}$".

The focus data here include focal lengths, F-numbers (FNO), angles of view $2\omega(°)$, variable surface separations d, back focuses (in air), full lengths (in air), and image heights, all given in mm except for the F-numbers and angles of view.

The effective imaging area of the imaging device is designed to have a rectangular shape. The value of the maximum image height is the one in the effective imaging area throughout Examples 1 and 2, and the half angle of view $\omega$ is the one of rays arriving at the maximum image height in that effective imaging area.

The focal length data on the respective lens groups are shown by the focal lengths f1 and f2 of the respective lens groups, given in mm.

Numeral Example 1

Surface Data

| Surface Number | r | d | nd | vd |
|---|---|---|---|---|
| 1(Aspheric) | 201.143 | 2.08 | 1.77250 | 49.60 |
| 2(Aspheric) | −42.609 | 0.10 | | |
| 3 | 8.969 | 1.77 | 1.83481 | 42.73 |
| 4 | 6.436 | 4.25 | | |
| 5 | −13.214 | 0.80 | 1.59551 | 39.24 |
| 6 | 9.000 | 3.99 | 1.83481 | 42.73 |
| 7 | −14.935 | 0.40 | | |
| 8(Stop) | ∞ | D8 | | |
| 9 | −8.000 | 0.50 | 1.74077 | 27.79 |
| 10 | 14.356 | 4.00 | 1.77377 | 47.17 |
| 11(Aspheric) | −9.703 | 0.10 | | |
| 12 | 12.420 | 3.00 | 1.88300 | 40.76 |
| 13 | −56.605 | 0.61 | | |
| 14(Aspheric) | 66.859 | 1.60 | 1.77377 | 47.17 |
| 15(Aspheric) | −40.043 | 0.10 | | |
| 16 | 17.768 | 0.80 | 1.75211 | 25.05 |
| 17 | 6.000 | D17 | | |
| 18 | ∞ | 0.30 | 1.51633 | 64.14 |
| 19 | ∞ | 0.50 | | |
| 20 | ∞ | 0.50 | 1.51633 | 64.14 |
| 21 | ∞ | 0.62 | | |
| Image Plane | ∞ | | | |

Aspheric Coefficient $1^{st}$ surface

K = 0.000
A4 = −1.23767e−04
A6 = −6.24020e−07
A8 = 1.52562e−08

$2^{nd}$ surface

K = 0.000
A4 = −8.62813e−05
A6 = −1.54319e−07
A8 = 1.34452e−08

$11^{th}$ surface

K = 0.000
A4 = 3.29284e−04
A6 = −4.77699e−06
A8 = 5.58840e−08

$14^{th}$ surface

K = 0.000
A4 = 5.34065e−04
A6 = −2.45866e−05
A8 = 2.32076e−07

$15^{th}$ surface

K = 0.000
A4 = 6.34365e−04
A6 = −2.10055e−05
A8 = 2.07520e−07
A10 = 3.38694e−10

Focus Data

| | Infinity | Transverse Magnification 1/85 | Object Image Distance 500 mm |
|---|---|---|---|
| D8 | 3.44 | 3.29 | 3.15 |
| D17 | 3.54 | 3.69 | 3.83 |

Various Data

| | |
|---|---|
| Focal Length | 10.92 |
| FNO. | 1.00 |
| Angle of View $2\omega$ (°) | 46.48 |
| Image Height | 4.63 |
| fb (in air) | 5.19 |
| Full Length (in air) | 32.73 |

Focal lengths of the Lens Groups

| | |
|---|---|
| f1 | 27.42 |
| f2 | 12.84 |

Numeral Example 2

Surface Data

| Surface Number | r | d | nd | vd |
|---|---|---|---|---|
| 1(Aspheric) | −1000.000 | 2.00 | 1.77250 | 49.60 |
| 2(Aspheric) | −36.817 | 0.10 | | |
| 3 | 9.522 | 2.00 | 1.83481 | 42.73 |
| 4 | 6.701 | 4.02 | | |
| 5 | −14.827 | 0.80 | 1.59551 | 39.24 |
| 6 | 9.000 | 4.02 | 1.83481 | 42.73 |
| 7 | −14.818 | 0.40 | | |
| 8(Stop) | ∞ | D8 | | |
| 9 | −8.000 | 0.80 | 1.74077 | 27.79 |
| 10 | 15.623 | 4.00 | 1.77377 | 47.17 |
| 11(Aspheric) | −9.653 | 0.20 | | |
| 12 | 11.560 | 3.00 | 1.88300 | 40.76 |
| 13 | −68.803 | 0.10 | | |
| 14(Aspheric) | 38.580 | 1.60 | 1.77377 | 47.17 |
| 15(Aspheric) | −90.247 | 0.10 | | |
| 16 | 20.625 | 0.80 | 1.75211 | 25.05 |
| 17 | 6.049 | D17 | | |
| 18 | ∞ | 0.30 | 1.51633 | 64.14 |
| 19 | ∞ | 0.50 | | |
| 20 | ∞ | 0.50 | 1.51633 | 64.14 |
| 21 | ∞ | 0.62 | | |
| Image Plane | ∞ | | | |

Aspheric Coefficient $1^{st}$ surface

K = 0.000
A4 = −1.28950e−04
A6 = −6.04265e−07
A8 = 1.82841e−08

$2^{nd}$ surface

K = 0.000
A4 = −7.52687e−05
A6 = −3.16039e−07
A8 = 1.80123e−08

-continued

Numeral Example 2

11th surface

K = 0.000
A4 = 3.42708e−04
A6 = −5.42091e−06
A8 = 6.23910e−08

14th surface

K = 0.000
A4 = 4.82612e−04
A6 = −1.88400e−05
A8 = 1.52772e−07

15th surface

K = 0.000
A4 = 5.18759e−04
A6 = −1.12303e−05
A8 = −1.41020e−08
A10 = 2.09877e−09

Focus Data

|  | Infinity | Transverse Magnification 1/85 | Object Image Distance 500 mm |
|---|---|---|---|
| D8 | 3.44 | 3.29 | 3.15 |
| D8 | 3.41 | 3.25 | 3.10 |
| D17 | 3.73 | 3.89 | 4.04 |

Various Data

| Focal Length | 10.92 |
|---|---|
| FNO. | 1.00 |
| Angle of View 2ω (°) | 47.18 |
| Image Height | 4.63 |
| fb (in air) | 5.38 |
| Full Length (in air) | 32.73 |

Focal lengths of the Lens Groups

| f1 | 25.46 |
|---|---|
| f2 | 13.01 |

Figure 3:
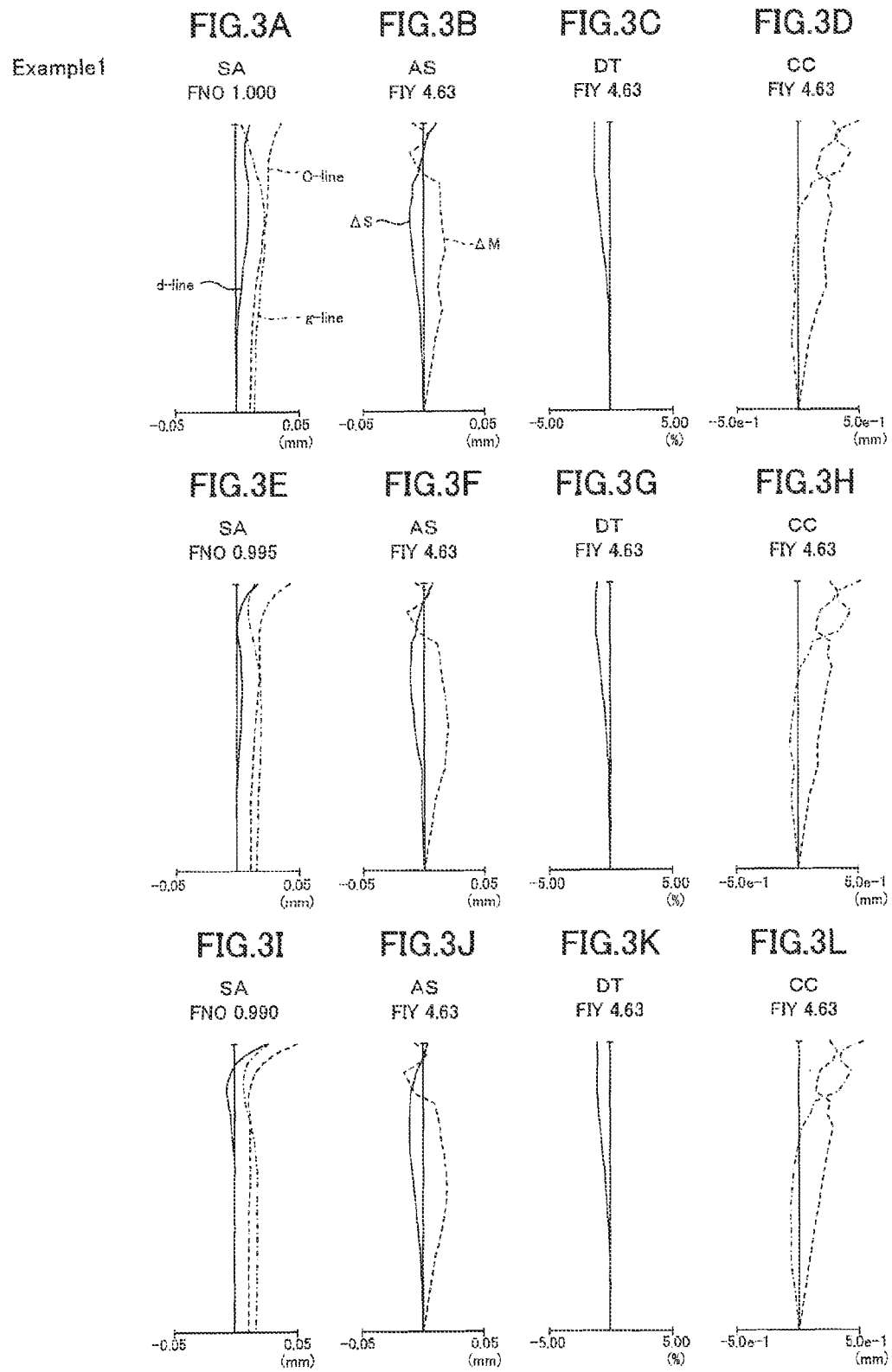
FIGS. 3A-3D show a set of aberration diagrams for the imaging optical system according to Example 1 at infinity.
FIGS. 3E-3H show a set of aberration diagrams for the imaging optical system according to Example 1 at a transverse magnification of 1/85.
FIGS. 3I-3L show a set of aberration diagrams for the imaging optical system according to Example 1 at an object image distance of 500 mm.
Figure 4:
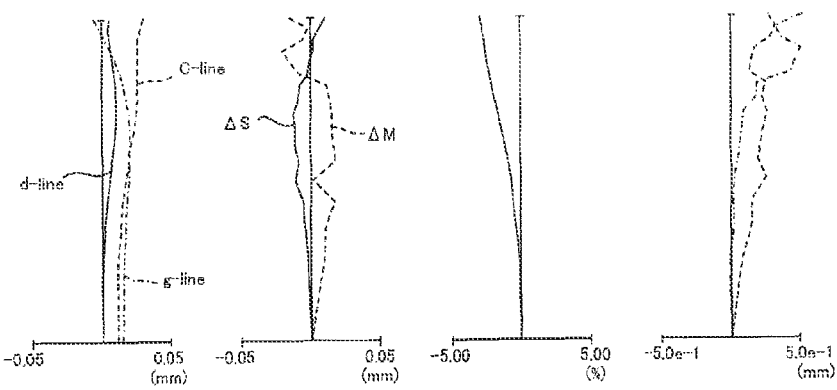
FIGS. 4A-4D show a set of aberration diagrams for the imaging optical system according to Example 2 at infinity.
FIGS. 4E-4H show a set of aberration diagrams for the imaging optical system according to Example 2 at a transverse magnification of 1/85.
FIGS. 4I-4L show a set of aberration diagrams for the imaging optical system according to Example 2 at an object image distance of 500 mm.

FIGS. 3 and 4 are sets of aberration diagrams for Examples 1 and 2 at infinity A to D, a transverse magnification of 1/85 E to H, and an object image distance of 500 mm I to L.

In those aberration diagrams, SA, AS, DT and CC stand for spherical aberrations, astigmatisms, distortions and chromatic aberrations of magnification, respectively. Given are spherical aberrations SA at the respective wavelengths of 587.6 mm (d-line: a solid line), 435.8 nm (g-line: a one-dot chain line) and 656.3 nm (C-line: a broken line), and chromatic aberrations of magnification CC at the respective wavelengths of 435.8 nm (g-line: a one-dot chain line) and 656.3 nm (C-line: a broken line) on a d-line basis. Astigmatisms DT are given with the sagittal image plane as a solid line and the meridional image plane as a broken line. Note here that FNO and FIY are indicative of an F-number and the maximum image height, respectively.

Tabulated below are the values of the respective parameters and Conditions (1) to (5) in Examples 1 and 2.

|  | Example 1 | Example 2 |
|---|---|---|
| Parameter |  |  |
| LTL | 27.54 | 27.35 |
| fB | 5.19 | 5.38 |
| D12 | 3.84 | 3.81 |
| IH | 4.63 | 4.63 |
| f1 | 27.42 | 25.46 |
| f2 | 12.84 | 13.01 |
| φ | 10.92 | 10.92 |
| f | 10.92 | 10.92 |
| Condition |  |  |
| (1) (LTL + fB)/fB | 6.31 | 6.08 |
| (2) D12/IH | 0.83 | 0.82 |
| (3) f1/f2 | 2.14 | 1.96 |
| (4) φ/f | 1.00 | 1.00 |
| (5) 2 × ω (°) | 46.48 | 47.18 |

Figure 5:
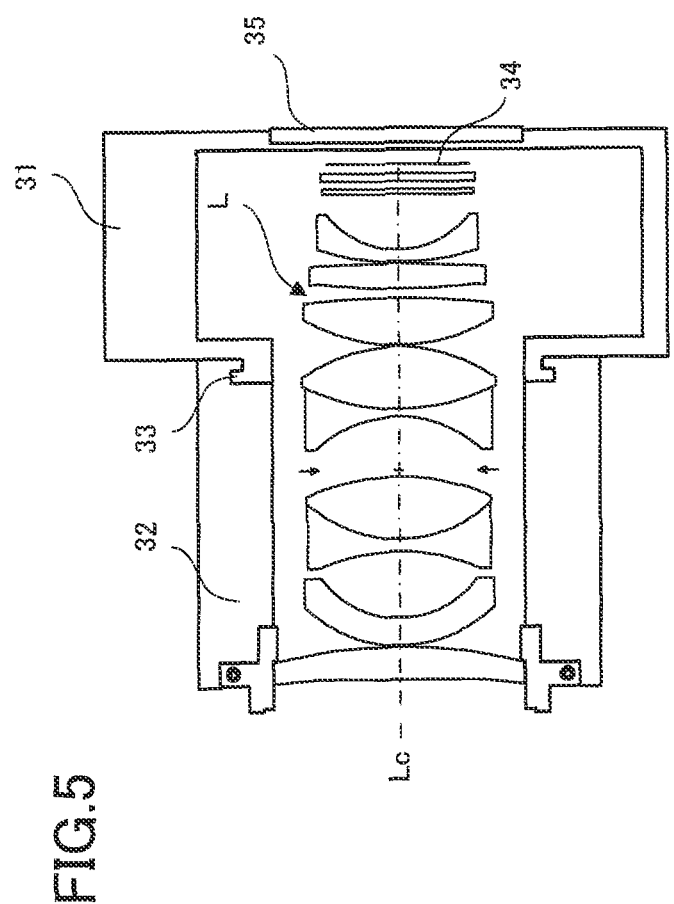
FIG. 5 is a cross-sectional view in schematic of the construction of a digital camera according to one embodiment of the invention.

FIG. 5 is a sectional view of a single-lens mirrorless camera that is one example of the imaging apparatus that uses the imaging optical system according to a specific embodiment of the invention and incorporates a small-format CCD, CMOS or the like as an imaging device. In FIG. 5, reference numeral 31 is a single-lens mirrorless camera; 32 is an imaging lens system received within a lens barrel; and 33 is a lens barrel mount for making the imaging lens system 32 attachable to or detachable from the single-lens mirrorless camera 31. For that lens mount, for instance, a screw or bayonet type mount may be used. The bayonet type mount is here used. Reference numerals 34 and 35 are an imaging device plane and a back monitor, respectively.

As the imaging lens system 32 in the thus assembled single-lens mirrorless camera 31, for instance, the zoom lenses of Examples 1 and 2 that embody the present invention may be used.

Figure 6:
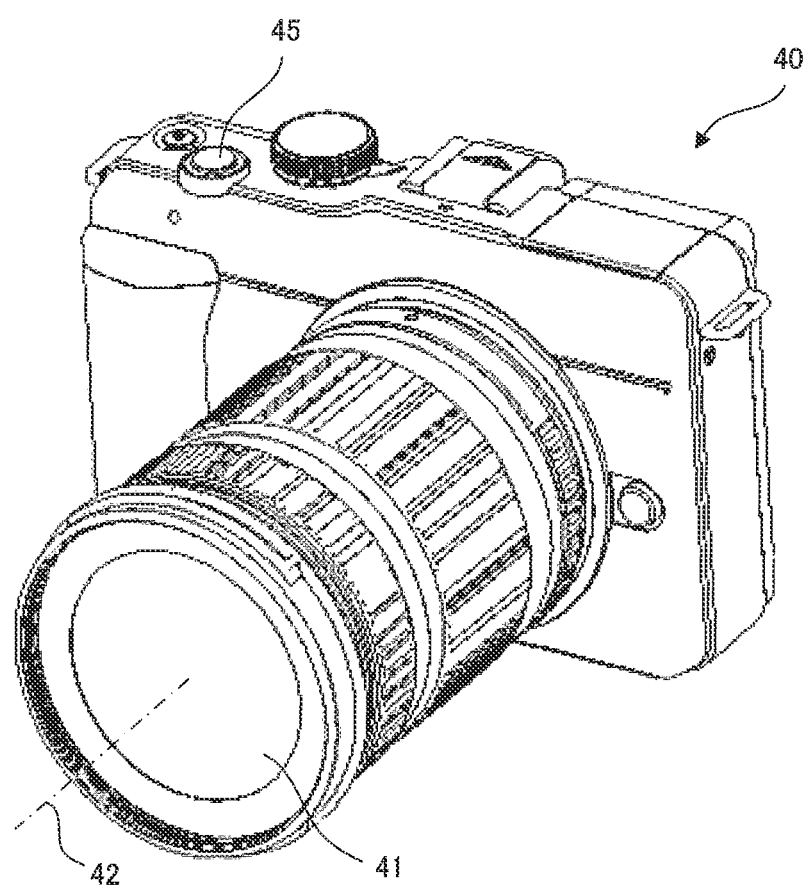
FIG. 6 is a front view in perspective of the outside appearance of a digital camera according to one embodiment of the invention.
Figure 7:
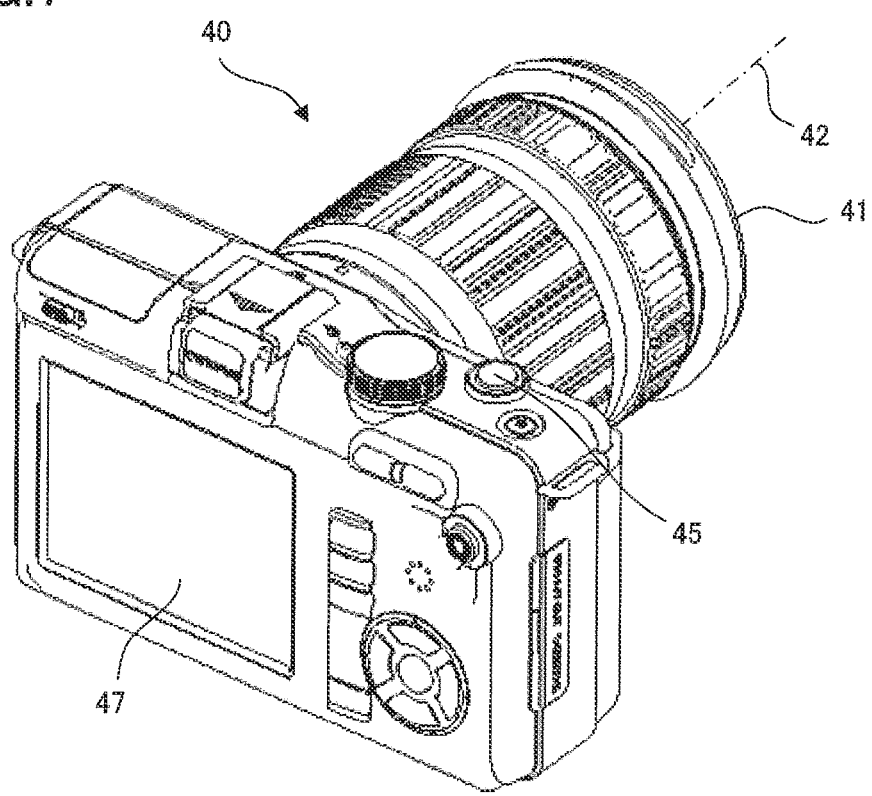
FIG. 7 is a rear view in perspective of the outside appearance of a digital camera according to one embodiment of the invention.

FIGS. 6 and 7 are illustrative in conception of the inventive imaging apparatus in which the imaging optical system is built in an image-taking optical system 41. More specifically, FIG. 6 is a front perspective view of the outside configuration of a digital camera 40 as the imaging apparatus, and FIG. 7 is a rear perspective view of the same.

In this embodiment, the digital camera 40 includes the image-taking optical system 41 positioned on a taking optical path 42, a shutter button 45, a liquid crystal display monitor 47, and so on. As the shutter button 45 located on the upper portion of the digital camera 40 is pressed down, it causes images to be taken through the image-taking optical system 41, for instance, the lens system of Example 1. An object image formed through the image-taking optical system 41 is formed on the imaging device (photoelectric transformation plane) located in the vicinity of the imaging plane. The object image received on the imaging device is displayed as an electronic image on the liquid crystal display monitor 47 located on the back of the camera via processing means. The taken electronic images may be recorded in recording means.

Figure 8:
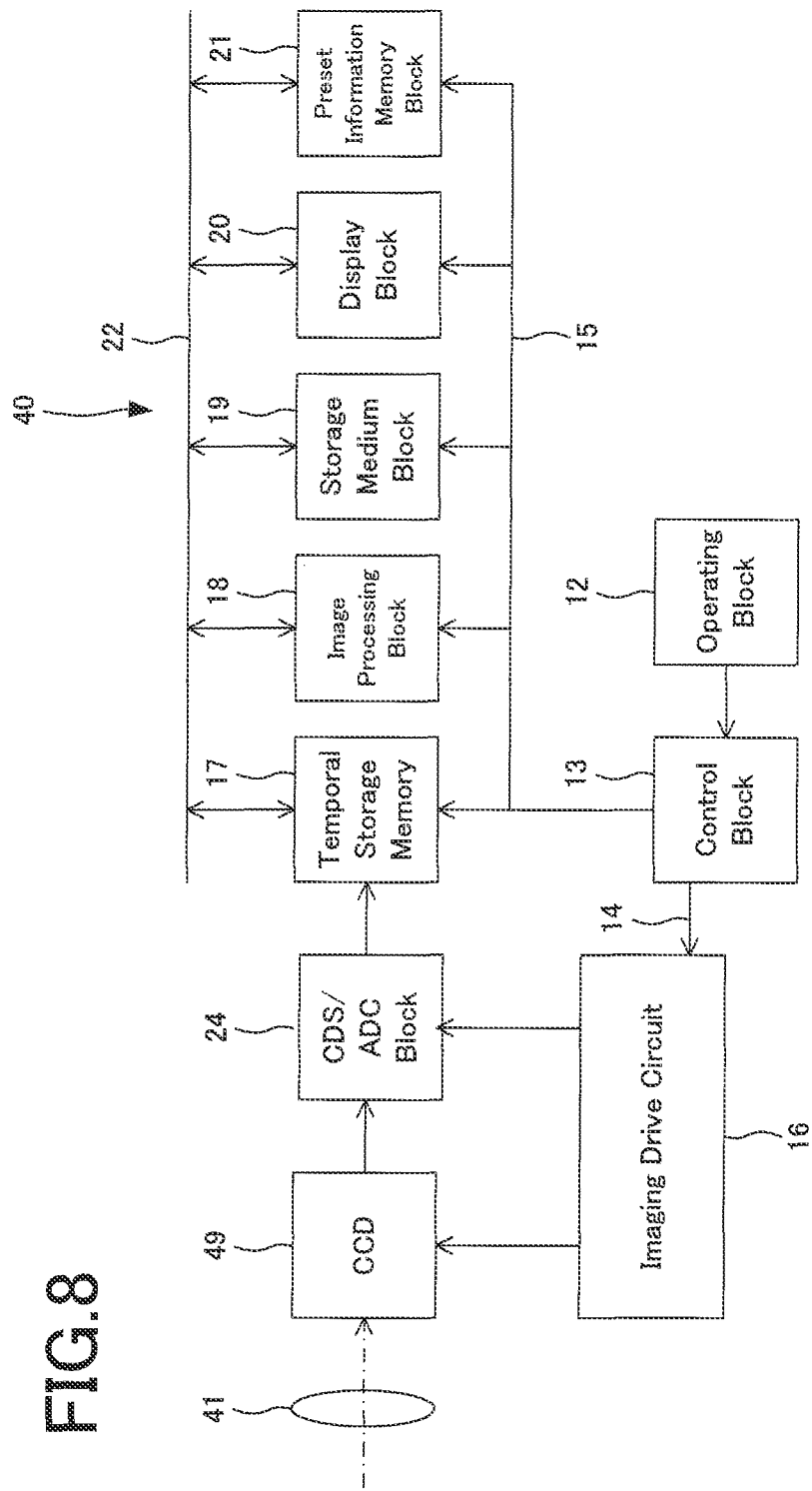
FIG. 8 is a block diagram illustrative of the controls of a digital camera according to one embodiment of the invention.

FIG. 8 is a block diagram for the internal circuitry in the main part of the digital camera 40. In what follows, the aforesaid processing means shown by 51 is made up of, typically, a CDS/ADC block 24, a temporary storage memory 17, and an image processing block 18, and a storage means 52 is made up of, typically, a storage medium block.

The digital camera 40 includes an operating block 12, a control block 13 connected to the operating block 12, an imaging drive circuit 16 and a temporal storage memory 17 connected to the control signal output port of the control block 13 via buses 14 and 15, an image processing block 18, a storage medium block 19, a display block 20, and a preset information storage memory block 21.

The temporal storage memory 17, image processing block 18, storage medium block 19, display block 20 and preset storage memory block 21 are designed such that data are mutually entered in or produced out of them via a bus 22, and the imaging drive circuit 16 is connected with the CCD 49 and CDS/ADC block 24.

The operating block 12 is a circuit including various input buttons and switches, through which event information entered (by a camera operator) from outside is notified to the control block. The control block 13 is a central computing unit that is made up of typically a CPU and has a built-in program memory (not shown): it is a circuit that, according to the program loaded in that program memory, has control over the digital camera 40.

The CCD 49 is an imaging device that is driven and controlled by the imaging drive circuit 16, and converts or transforms light quantity per pixel of the object image formed through the imaging optical system 41 into electric signals that are in turn sent out to the CDS/ADC block 24.

The CDS/ADC block 24 is a circuit that amplifies electrical signals entered from CCD 49 and subjects them to analog-to-digital conversion so that image raw data (Bayer data: hereinafter called the RAW data) subjected only to amplification and digital conversion are sent out to the temporal memory 17.

The temporal storage memory 17 is a buffer made up of typically an SDRAM: it is a memory device for temporal storage of the RAW data produced out of the CDS/ADC block 24. The image processing block 18 is a circuit that reads out the RAW data stored in the temporal storage memory 17 or the RAW data stored in the storage medium block 19 thereby electrically implementing various forms of processing including distortion correction, based on an image quality parameter instructed by the control block 13.

The storage medium block 19 detachably receives a card type or stick type recording medium comprising typically a flash memory so that the RAW data transferred from the temporal memory 17 or image data processed at the image processing block 18 are recorded and held in that flash memory.

The display block 20 includes the liquid crystal display monitor 47 to display the taken RAW data or image data, operating menus or the like on it. The preset information storage memory block 21 includes a ROM sub-block having various image quality parameters previously loaded in it, and a RAM sub-block for storing an image quality parameter read out of that ROM sub-block by entering operation of the operating block 12.

The thus assembled digital camera 40, because the inventive zoom lens is used as the imaging optical system 41, may be used as a small-format imaging apparatus suitable well fit for the taking of moving images.

While various embodiments of the invention have been explained, it is to be understood that the present invention is never limited thereto, and embodiments comprising combinations of the essential requirements and limitations are embraced in the category of the invention too.

What is claimed is:

1. An imaging optical system comprising, in order from an object side to an image side,
   a first lens group having positive refracting power,
   an aperture stop, and
   a second lens group having positive refracting power,
   wherein:
   there is no lens group other than said first lens group and said second lens group,
   said first lens group consists of three lens subgroups: in order from the object side to the image side, a first lens subgroup having positive refracting power, a second lens subgroup having negative refracting power, and a third lens subgroup having positive refracting power, with satisfaction of the following Conditions (1) and (2):

$$4 < (LTL + fB)/fB < 15 \quad (1)$$

$$0.3 < D12/IH < 4 \quad (2)$$

where fB is an on-axis distance, as calculated on an air basis, from an image side-surface in said second lens group to an image plane upon focusing on an object at infinity,
LTL is an on-axis distance from an object side-surface in said first lens group to the image side-surface in said second lens group,
D12 is an on-axis length from an image side-surface in said first lens group to an object side-surface in said second lens group upon focusing on an object at infinity, and
IH is a maximum image height.

2. The imaging optical system as recited in claim 1, wherein upon focusing from an object at infinity to a near distance object, said first lens group remains stationary, and second lens group moves to the object side.

3. The imaging optical system as recited in claim 1, wherein:
   said third lens subgroup includes a negative lens, and a positive lens located more on the image side than said negative lens.

4. The imaging optical system as recited in claim 1, wherein:
   said first lens subgroup includes an aspheric lens surface.

5. The imaging optical system as recited in claim 1, wherein:
   said first lens subgroup consists of one positive lens component,
   said second lens subgroup consists of one negative lens component, and
   said third lens subgroup consists of one positive lens component, provided that the lens component is a lens block having only two refractive surfaces in on-axis contact with air: an object side-surface and an image side-surface.

6. The imaging optical system as recited in claim 1, wherein:
   said third lens subgroup consists of one cemented lens including a positive lens and a negative lens.

7. An imaging apparatus, comprising:
   the imaging optical system as recited in claim 1, and
   an imaging device located on the image side of said imaging optical system.

8. The imaging optical system as recited in claim 1, which satisfies the following Condition (1-1):

$$5 < (LTL + fB)/fB < 11 \quad (1\text{-}1)$$

where fB is the on-axis distance, as calculated on the air basis, from the image side-surface in said second lens group to the image plane upon focusing on the object at infinity, and
LTL is the on-axis distance from the object side-surface in said first lens group to the image side-surface in said second lens group.

9. The imaging optical system as recited in claim 1, which satisfies the following Condition (2-1):

$$0.5 < D12/IH < 2.5 \quad (2\text{-}1)$$

where D12 is the on-axis length from the image side-surface in said first lens group to the object side-surface in said second lens group upon focusing on the object at infinity, and
IH is the maximum image height.

10. The imaging optical system as recited in claim 1, which further satisfies the following Condition (3):

$$1.2 < f1/f2 < 2.5 \tag{3}$$

where f1 is a focal length of the first lens group, and
f2 is a focal length of the second lens group.

11. The imaging optical system as recited in claim 10, which satisfies the following Condition (3-1):

$$1.5 < f1/f2 < 2.4 \tag{3-1}$$

where f1 is the focal length of the first lens group, and
f2 is the focal length of the second lens group.

12. The imaging optical system as recited in claim 1, wherein:
said second lens group consists of, in order from the object side to the image side, a fourth lens subgroup and a fifth lens subgroup of positive refracting power, wherein said fourth lens subgroup includes a negative lens that is a lens positioned on the most object side in said fourth lens subgroup, and said fifth lens subgroup includes a plurality of positive lenses.

13. The imaging optical system as recited in claim 12, wherein said fourth lens subgroup and said fifth lens subgroup each include an aspheric lens surface.

14. The imaging optical system as recited in claim 12, wherein said fourth lens subgroup consists of one cemented lens including a negative lens and a positive lens.

15. The imaging optical system as recited in claim 12, wherein:
said fifth lens subgroup consists of three lens components: in order from the object side to the image side, a positive lens component, a positive lens component and a negative lens component, provided that the lens component is a lens block having only two refractive surfaces in on-axis contact with air: an object side-surface and an image side-surface.

16. The imaging optical system as recited in claim 1, which further satisfies the following Conditions (4) and (5):

$$0.80 < \phi/f < 1.5 \tag{4}$$

$$40° < 2 \times \omega < 70° \tag{5}$$

where $\phi$ is a maximum diameter of an entrance pupil of said imaging optical system,
f is a focal length of said imaging optical system, and
$\phi$ is a maximum taking half angle of view of said imaging optical system.

17. The imaging optical system as recited in claim 16, which satisfies the following Condition (4-1):

$$0.85 < \phi/f < 1.3 \tag{4-1}$$

where $\phi$ is the maximum diameter of the entrance pupil of said imaging optical system, and
f is the focal length of said imaging optical system.

18. The imaging optical system as recited in claim 16, which satisfies the following Condition (5-1):

$$42° < 2 \times \omega < 60° \tag{5-1}$$

where $\omega$ is the maximum taking half angle of view of said imaging optical system.

19. An imaging optical system comprising, in order from an object side to an image side,
a first lens group having positive refracting power,
an aperture stop, and
a second lens group having positive refracting power, wherein:
there is no lens group other than said first lens group and said second lens group,
said first lens group consists of three lens subgroups: in order from the object side to the image side, a first lens subgroup having positive refracting power, a second lens subgroup having negative refracting power, and a third lens subgroup having positive refracting power, and
upon focusing from an object at infinity to a near distance object, said first lens group remains stationary, and said second lens group moves to the object side, with satisfaction of the following Condition (3):

$$1.2 < f1/f2 < 2.5 \tag{3}$$

where f1 is a focal length of the first lens group, and
f2 is a focal length of the second lens group.

20. The imaging optical system as recited in claim 19, which satisfies the following Condition (3-1):

$$1.5 < f1/f2 < 2.4 \tag{3-1}$$

where f1 is the focal length of the first lens group, and
f2 is the focal length of the second lens group.

* * * * *